United States Patent [19]
Schreurs

[11] 3,833,398
[45] Sept. 3, 1974

[54] METHOD OF PROVIDING AN ADHERENT PHOSPHOR COATING ON A FLUORESCENT LAMP

[75] Inventor: Willy P. Schreurs, Danvers, Mass.
[73] Assignee: GTE Sylvania Incorporated, Danvers, Mass.
[22] Filed: May 3, 1973
[21] Appl. No.: 356,735

[52] U.S. Cl.......... 117/33.5 L, 117/97, 252/301.45, 260/124 R
[51] Int. Cl............................................. B44d 1/02
[58] Field of Search.................. 117/33.5 L, 97; 252/301.45; 260/124 R

[56] References Cited
UNITED STATES PATENTS

| | | | |
|---|---|---|---|
| 3,310,418 | 3/1967 | Friedman et al. | 117/33.5 L |
| 3,435,271 | 3/1969 | Vodoklys | 117/33.5 L |
| 3,676,176 | 7/1972 | Schreurs | 117/33.5 L |
| 3,679,452 | 7/1972 | Ropp | 117/33.5 L |
| 3,757,938 | 9/1973 | Wachtel | 117/33.5 L |

Primary Examiner—William D. Martin
Assistant Examiner—William R. Trenor
Attorney, Agent, or Firm—James Theodosopoulos

[57] ABSTRACT

In a method of coating fluorescent lamp glass envelopes to provide improved adhesion of phosphor and alumina particles, conditioning the phosphor and aluminium oxide particles in a solution of ammonium lignosulfonate, removing the particles from the solution, washing, providing an aqueous suspension containing the conditioned particles and an organic binder and applying the particles to the glass envelope to provide a coating.

4 Claims, No Drawings

METHOD OF PROVIDING AN ADHERENT PHOSPHOR COATING ON A FLUORESCENT LAMP

DESCRIPTION OF THE PRIOR ART

Phosphor coatings have generally been deposited on the inner surface of fluorescent lamp envelopes from suspensions that contained powdered phosphor material and an organic binder dispersed in an organic solvent. Lately, however, it has become desirable to use water as the suspending liquid, instead of an organic solvent, in order to avoid discharging large quantities of organic solvent fumes into the atmosphere. Also, advantageously, aqueous suspensions are non-flammable.

However, there is a problem in obtaining adequate adherence of the phosphor coating to the lamp envelope when aqueous suspensions are used. This problem is especially acute in the case of high speed production equipment now commonly used in the manufacture of tubular fluorescent lamps. In such equipment, the lamp envelopes which have been coated with phosphor and then baked at about 400° to 650°C, are connected at both ends to an exhaust machine by means of small diameter rubber tubing; an inert gas, such as nitrogen or argon, is then introduced at one end of the envelope while exhaust is taking place at the other end. It is estimated that the incoming gas velocity at the blow hole facing the phosphor coated glass wall is greater than 1.5 meters per second. Unless the phosphor has very good adhesion to the glass, the incoming gas can blow off part of the phosphor coating, thereby rendering the lamp envelope unacceptable.

The use of inorganic binders, or inorganic adherence promoters, such as boron anhydride, barium nitrate, barium phosphate and phosphoric acid, which melt when the phosphor coating is baked, can improve the adherence of the phosphor coating sufficiently to prevent blow-off of phosphor particles during the exhaust cycle. However, such inorganic materials are generally deleterious to the efficiency and/or maintenance of the phosphor.

Disclosed in the prior art are aqueous phosphor suspensions containing a temporary organic binder, such as carboxymethyl cellulose, hydroxyethyl cellulose, polyacrylic acid or a copolymer of methyl vinyl ether and maleic anhydride, and an inorganic finely powdered adherence promoter, such as alumina, silica, magnesia or titania. However, such suspensions do not generally provide sufficient phosphor adherence to prevent particle blow-off during the exhaust cycle.

It is an object of this invention to provide a phosphor coating on a fluorescent lamp envelope having greatly improved adherence thereto.

SUMMARY OF THE INVENTION

A method of coating fluorescent lamp glass envelopes, in accordance with this invention, involves the use of an aqueous suspension containing phosphor powder, an organic binder and finely powdered aluminum oxide. However, prior to preparation of the suspension, the phosphor and aluminum oxide are conditioned or treated in a solution of ammonium lignosulfonate. Such a treatment results in greatly improved adherence of the phosphor particles to the lamp envelope.

DESCRIPTION OF THE PREFERRED EMBODIMENT

A fluorescent lamp phosphor, for example, calcium halophosphate activated with antimony and manganese, is dispersed in water. The particle size of such a phosphor is typically less than 25 microns, since particles in excess of about 25 microns would result in an unduly coarse texture of the phosphor coating.

Next, sub-micron size aluminum oxide particles and ammonium lignosulfonate, which has been purified by the well-known ion exchange process, are added to the aqueous phosphor suspension. The proportion of aluminum oxide to phosphor is between about 0.2 and 2.0 weight percent, preferably 0.5, and the proportion of ammonium lignosulfonate is between about 0.02 and 0.2 weight percent, preferably 0.1, of the phosphor.

The pH of the aqueous suspension, where the phosphor represents approximately 25 percent by weight of the total suspension, is adjusted between 7.0 and 10.0 with ammonium hydroxide and a vigorous stirring is maintained for approximately 30 minutes. This contacting process between the lignosulfonate and the phosphor particles, and particularly the high-area sub-micron size aluminum oxide particles, apparently modifies the surface charge of the particles, rendering them substantive to the relatively negative glass surface.

Although no explanation can be given as to which particular site of the very complicated lignosulfonate structure is responsible for modifying the surface characteristics of the particles, the unexpected improved adhesion observed in organic-free phosphor films prepared by this method is probably attributed to the combined effects of high charge and strong sorption characteristics of the lignosulfonates.

After the contacting process, the solid particles are extracted from the suspension by filtering or centrifuging, given a thorough rinse with deionized water to eliminate all excess lignosulfonates, and re-suspended in a water solution of polyoxyethylene, such as sold by Union Carbide under the trade name Polyox WSRN-3000.

The proportion of polyoxyethylene may be varied according to the viscosity required to suit any of the well-known phosphor coating methods. Amounts of dry polyoxyethylene ranging from 0.5 to 5.0 weight percent of the phosphor, and preferably 1 percent, have been found quite satisfactory.

The polyoxyethylene solution may be conveniently prepared as recommended by the manufacturer by pre-dispersing the binder in a minimum amount of isopropanol and adding deionized water to obtain the required viscosity for the vehicle. The turbidity usually observed in such solutions is attributed to some residual calcium salts, which can be readily eliminated by the well-known ion exchange process.

Addition of a small amount of defoamer, usually less than 0.5 weight percent of the phosphor, to the final coating suspension may be needed depending on the degree of air entrapment caused by the various mechanical devices used in the coating process. Pluronic L-61, a non-ionic block polymer made by Wyandotte Chemical Corporation, was found compatible with the coating suspension according to the invention.

In one specific embodiment, the polyoxyethylene solution was prepared by dispersing 92.5 grams of Polyox WSRN-3000 resin in 700 ml of isopropanol and then adding 3000 ml of deionized water.

The phosphor coating suspension was prepared by dispersing the solids (350 grams of phosphor and 2.1 grams of sub-micron size aluminum oxide), which had been treated with ammonium lignosulfonate, as described previously, in 300 ml of the polyoxyethylene solution plus 55 ml of deionized water and 1 ml of Pluoronic L-61.

Fluorescent lamp envelopes were internally coated with this phosphor suspension by usual methods, such as flushing and after the phosphor coating was dry, the coated envelopes were baked at 400 to 650° C for from 1 to 6 minutes to burn out all organic material. The adherence of the phosphor layer was 10 ounces per square inch. Without the lignosulfonate treatment, the phosphor adherence is only 0.5 ounce per square inch.

I claim:

1. A method of providing an adherent phosphor coating on a fluorescent lamp glass envelope comprising the steps of: mixing aqueously suspended phosphor particles and sub-micron size aluminum oxide particles with an ammonium lignosulfonate solution; separating and washing the solid particles; resuspending the solid particles in an aqueous solution containing polyoxyethylene resin to provide a phosphor coating suspension; coating the inner surface of a fluorescent lamp glass envelope with said suspension; drying the coating; and baking the coated envelope at a temperature sufficient to eliminate organic material from said coating.

2. The method of claim 1 wherein the weight ratio of the aluminum oxide particles to the phosphor particles is between about 0.2 and 2.0 percent.

3. The method of claim 1 wherein the weight ratio of ammonium lignosulfonate to phosphor is between about 0.02 and 0.2 percent.

4. The method of claim 1 wherein the weight ratio of polyoxyethylene to phosphor in the coating suspension is between about 0.5 and 5.0 percent.

* * * * *